United States Patent [19]

Haszeldine et al.

[11] 3,927,129

[45] Dec. 16, 1975

[54] PROCESS FOR INSERTION OF HEXAFLUOROPROPENE AT THE ALIPHATIC CARBON-HYDROGEN BOND OF A FUNCTIONALLY SUBSTITUTED HYDROCARBON

[75] Inventors: Robert Neville Haszeldine, Disley; Ronald Rowland, Padgate, both of England

[73] Assignee: Pennwalt Corporation, Philadelphia, Pa.

[22] Filed: Jan. 5, 1973

[21] Appl. No.: 321,162

[30] Foreign Application Priority Data

Jan. 14, 1972 United Kingdom.................. 1989/72

[52] U.S. Cl........ 260/653.1 R; 260/465.7; 260/487; 260/539 R; 260/601 H; 260/609 R; 260/614 F; 260/615 BF; 260/615 F

[51] Int. Cl.$^2$.................... C07C 17/26; C07C 19/08
[58] Field of Search.............................. 260/653.1 R

[56] References Cited
UNITED STATES PATENTS 2,983,764   5/1961   Knaack........................ 260/653.1 R

OTHER PUBLICATIONS

Tatlon et al., Chemical Abstracts, 76 15373r (1972).

*Primary Examiner*—D. Horwitz

[57] ABSTRACT

Process for the thermally induced addition of hexafluoropropene to a substituted hydrocarbon compound free of acetylenic and terminal ethylenic unsaturation, and containing at least one aliphatic carbon-hydrogen bond and at least one functional group inert under the conditions of the reaction.

3 Claims, No Drawings

PROCESS FOR INSERTION OF HEXAFLUOROPROPENE AT THE ALIPHATIC CARBON-HYDROGEN BOND OF A FUNCTIONALLY SUBSTITUTED HYDROCARBON

This invention concerns a novel reaction for the preparation of fluorinated organic compounds and compositions. More particularly this invention concerns a novel reaction for the preparation of fluorinated organic compounds and compositions which consist of or comprise hydrocarbon molecules or macromolecules having one or more terminal and/or pendant

groups; the bracket in the formula

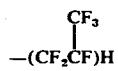

being used to indicate that the hydrogen atom may be attached either to the primary carbon atom, giving rise to a

group, or to the secondary carbon atom, giving rise to a

group.

A variety of methods have been proposed hitherto for the preparation of fluorinated organic compounds and compositions. The main practical method has been by the reaction of organic chlorine-containing compounds with various metallic fluorides thereby to replace the chlorine atom or atoms by fluorine. The particular drawback of this method is the cumbersome use of inorganic materials. The method is also limited in its applicability. Other methods have involved electrochemical fluorination and direction fluorination of organic compounds, for example, with hydrogen fluoride, fluorine, or certain inorganic fluorides. Again procedures are involved, yields are often poor, and decomposition products of the organic starting material often predominate.

Also known are various telomerisation reactions in which a telogen is reacted with a fluoroolefin to form telomers containing one or more repeating fluoroolefin units. Such reactions proceed by a free radical mechanism involving the initial scission of the telogen to form a free radical, followed by chain propagation and transfer and finally chain termination, to build up telomers of the type R(fluoroolefin)$_n$X, where RX is the formula of the telogen. Such processes are disadvantageous in that it is difficult to control the value of $n$ in the final product with any degree of precision, the product usually being a mixture of compounds having a range of values of $n$. Although X in the formula of the telogen is usually halogen, the telomerisation reaction has been extended to telogens where X is hydrogen, see, for example, U.S. Pat. Nos. 2,411,158, 2,433,844, 2,540,088 and 2,559,628. Such telomerisation reactions usually require the presence of a free radical initiator, e.g. a peroxy compound or an azo compound, etc., which may be disadvantageous in that initiator fragments will appear as contaminants in the final product.

Yet another technique of introducing fluorine containing groups into a non-fluorinated base material, particularly polymeric materials, such as polyethylene, polyamides, etc. involves bombarding the base material, whilst in the presence of a fluoolefin, with high energy particles e.g. highly accelerated electrons or nuclear particles such as protons, neutrons, alpha particles, deuterons beta particles etc. Such techniques are disclosed, for example, in U.S. Pat. No. 3,065,157. The generation of such high energy particles, of course requires highly sophisticated and expensive equipment.

By contrast with the above techniques, and as disclosed in our copending application filed simultaneously herewith, Ser. No. 321,161, filed Jan. 5, 1973, it has now been found that a hexafluoropropene unit can be inserted into an aliphatic carbon-hydrogen bond, i.e. a bond between a hydrogen atom and a carbon atom which does not form part of an aromatic ring, in a highly controlled manner to give a 1:1 adduct, by the simple technique of heating the compound containing the aliphatic carbon-hydrogen bond with hexafluoropropene in the complete absence of air or other free oxygen containing gas and in the complete absence of any chemical initiator, i.e. free-radical forming chemical catalyst. By 1:1 adduct we mean the insertion of one and only one hexafluoropropene unit into one aliphatic carbon-hydrogen bond in the molecule, i.e.

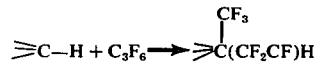

Where the starting compound has more than one aliphatic carbon-hydrogen bond, one molecule of the starting compound may react with two or more molecules of hexafluoropropene to yield a product having a pluralily of pendant and/or terminal

groups, although for reasons subsequently explained, except for macromolecular materials, products having only one inserted hexafluoropropene unit will generally predominate. The process of the invention is thus quite distinct from a telomerisation procedure giving rise to terminal groups of the formula

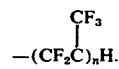

While we do not wish to be bound by any theory, the insertion reaction is believed not to proceed by a reaction mechanism involving initiation by free mono-radicals. Thus, the conditions do not exist for free radical chain propagation leading to adducts having a chain of repeating fluoroolefin units as in a telomerisation procedure. According to the procedures described more fully in that copending application the insertion reaction is applied to starting materials which are hydrocarbons containing at least one aliphatic C—H bond and which is free of acetylenic or terminal ethylenic unsaturation, i.e. terminal groups of the formula

In accordance with the present invention the insertion reaction described above is applied to starting materials which are substituted hydrocarbons free of acetylenic or terminal ethylenic unsaturation and containing at least one aliphatic C—H bond and at least one functional group inert under the conditions of the reaction. Such functional groups include, for example, carboxyl, ester, aldehyde, ketone, hydroxy (e.g., alcohol), ether, thioether and cyanide groups as well as sulfur, and halogen (e.g., chlorine, fluorine and bromine) atoms.

Typical substituted hydrocarbons usable as starting materials in accordance with the present invention are carboxylic acids such as acetic acid, propionic acid, isobutyric acid, lauric acid, palmitic acid, stearic acid, toluic acid, phenylacetic acid, adipic acid, sebacic acid, malonic acid, carboxylic acid esters and polyesters with monohydric and polyhydric alcohols, aldehydes and ketones such as isobutyraldehyde, heptaldehyde, stearaldehyde, acetone, methyl ethyl ketone, acetophenone, and cyclohexanone; alcohols such as methanol, ethanol, butanol, amyl alcohol, hexanol, heptanol, octanol, cyclohexanol, butan-2-ol, 1-phenylethanol, or 2-phenylethanol; ethers such as dimethyl ether, diethyl ether, dibutyl ether, methyl amyl ether, methyl cyclohexyl ether, anisole, trioxane, dioxane, tetrahydropyran, tetrahydrofuran 1,2-dimethoxyethane, methylal, 1,3-dioxalane; alkyl sulfides such as dimethyl sulfide, dibutyl sulfide; halogenated and polyhalogenated compounds, including chloroalkanes, fluoroalkanes, chlorofluoroalkanes, bromoalkanes and the like, such as methyl chloride, methylene chloride, chloroform, methyl fluoride, methylene fluoride, chlorodifluoromethane, methyl bromide, ethyl chloride, ethyl fluoride, ethyl bromide, 1,1-difluoroethane, 1,1,1-trifluoroethane, 1,1,1-trichloroethane, 2,2-dichloropropane, n-propyl chloride, n-propyl fluoride, n-hexyl chloride, n-hexyl fluoride, 1-chloro-1, 1-difluoroethane, 1-phenyl-1-chloroethane; and cyanides such as methyl cyanide.

Also included as starting materials in accordance with the present invention are macromolecular materials such as polyesters, polycarbonates, polyamides, acrylate polymers and copolymers and haloolefin polymers and copolymers.

Turning now to the products of the invention reaction of the present invention, and leaving aside for the moment macromolecular starting materials, mono-inserted products will generally predominate. However, di- and poly-inserted products can be obtained using appropriate reaction conditions and reactant ratios.

As has already been indicated, the hexafluoropropene unit can, in theory, be inserted into the C—H bond in either of two directions, giving rise either to a straight or branched chain structure in the terminal or pendant group. In practice, it is found that the insertion reaction of the invention usually leads to the formation of the straight chain grouping, i.e. a terminal or pendant

group. With certain starting materials, however, the isomeric grouping is also obtained.

The insertion reaction of the present invention provides a route to a wide range of substituted hydrocarbon compounds having a substituents both a functional group, e.g. carboxyl, hydroxyl, halogen, cyanide, or an ester or ether linkage, and a fluoroalkyl group. The products are often liquids and oils with a low freezing point and of good chemical and thermal stability attributable to the presence of the fluorocarbon unit or units. These liquids and oils make useful dielectric liquids, non-corrosive heat exchange media, solvents, lubricants, etc. Many of the products obtainable by the reaction of the present invention, e.g. those obtained from carboxylic acids exhibit useful surface active properties. The presence of the functional group renders the products obtained by the insertion reaction of the present invention particularly valuable starting materials for the synthesis of other useful derivatives. For example, the polyfluoroalkanols obtained by inserting a hexafluoropropylene unit into an alkanol by the method of this invention may be esterified, for example, with acrylic acid, to give fluoroalkyl acrylates useful for conversion to products, e.g. polymers, useful for their surface active properties and capable of imparting water-proof, crease and stain resistant finishes of textiles.

The fluorinated adducts obtained by the present invention can also be used as intermediates in the preparation of agricultural and pharmaceutical chemicals. Adducts obtained by inserting a hexafluoropropene group into an already fluorinated reactant, represent new compounds of potential value as aerosol propellents, refrigerants, anaesthetics and intermediates for the fluoropolymer industry.

As already indicated, the insertion reaction of the invention is carried out simply by using heat in the absence of air or other free-oxygen-containing gas and in the absence of any chemical initiator. Conveniently the reaction is carried out by heating the reactants together in a closed vessel. The reaction may be performed under an inert atmosphere or in a vessel from which all extraneous material is excluded, for example, by evacuation, followed by vacuum transfer of the reactants into the evacuated vessel. The reaction proceeds satisfactorily in the absence of solvents, but the presence of a solvent is not to be excluded. Indeed, in certain instances, the presence of an inert solvent may be advantageous, for example where a substituted hydrocarbon reactant is used which is solid at the reaction temperature. The insertion reaction proceeds satisfactorily at temperatures in the range of about 160° to about 350°C and at pressures of from about 1 to about 250 atmospheres. Preferred conditions include a reaction temperature of at least about 220°C, most preferably a temperature in the range of 250°C to 300°C, and a pressure of from 10 to 100 atmospheres. Where the substituted hydrocarbon is a volatile low-molecular weight material the reaction may be carried out under continuous flow conditions using a higher contact temperature but a shorter residence period.

Reactant ratios are not critical and are largely dependent upon the degree of insertion desired. A molar excess of hexafluoropropene will favour the formation of di- and poly-insertion products. A molar excess of hydrocarbon will favour the formation of mono insertion products. For highest yields of the mono insertion products, hydrocarbon: hexafluoropropene molar ratios in the range of 2:1 to 4:1 are preferred.

Turning now to the macromolecular reactants, the insertion reaction of the present invention may be used to modify the properties of macromolecular materials, such as polycarbonates, polyamides, polyesters, and polyhaloolefins, in particular their melt flow and molding characteristics and their surface properties, and to enhance their chemical and thermal stability. When using a macromolecular reactant, the same conditons of temperature and pressure as discussed above for the lower molecular weight reactants will apply. In many cases, however, it may be desirable to operate at temperatures at the lower end of the range to avoid excessive thermal degradation of the polymer.

The invention is illustrated by the following Examples.

EXAMPLE 1

Preparation of -(1,1,2,3,3,2-Hexafluoropropyl)trihydropyran.

Tetrahydropyran (2.94 g., 34.2 mmole) and hexafluoropropene (1.71 g., 11.4 mmole), heated at 300° for 4 days, gave a moderate yield (10% based on $C_3F_6$ consumed) of -(1,1,2,3,3,3-hexafluoropropyl)trihydropyran. Found: C, 40.6; H, 4.5; F, 48.6%; M (mass spectrometry), 236. $C_8H_{10}F_6O$ requires C, 40.7; H, 4.3; F, 48.3%; M 236, b.p. 164°–168°, resolved into equimolecule amounts of two diastereoisomers (by preparative g.l.c.).

EXAMPLE 2

Preparation of 2,2,3,4,4,4-Hexafluorobutyl methyl ether.

Dimethyl ester (1.57 g., 34.2 mmole) and hexafluoropropene (1.71 g., 11.4 mmole), heated at 280° for 4 days in a Pyrex vessel gave (i) hexafluoropropene (0.09 g., 0.6 mmole; 5% recovery; (ii) dimethyl ether (1.01 g., 22.0 mmole; 64% recovery); (iii) 1,1,2,3,3-hexafluorobutane (1.43 g., 8.6 mmole; 80% based on $C_3F_6$ consumed); (iv) 2,2,3,4,4,4-hexafluorobutyl methyl ether (0.22 g., 1.1 mmole; 10% based on $C_3F_6$ consumed) (Found: M 197. Calc. for $C_5H_6F_6O$: M, 196), b.p. 87°.

EXAMPLE 3

Preparation of 2,2,3,4,4,4-Hexafluorobutan-1-ol.

Methanol (1.09 g., 34.2 mmole) and hexafluoropropene (1.71 g., 11.4 mmole), heated at 280° for 4 days in a Pyrex vessel gave (i) hexafluoropropene (0.03 g., 0.2 mmole; 2% recovery); (ii) methanol (o. 62 g., 19.4 mmole; 57% recovery), b.p. 64°–65°; (iii) a fraction b.p. 108°–113° (1.81 g.) which contained 2,2,3,4,4,4-hexafluorobutan-1-ol: $CF_3CFHCF_2CH_2OH$ (1.72 g., 9.5 mmole; 85% based on $C_3F_6$ consumed); Found: C, 26.6; H, 2.4% M (mass spectrometry), 182. Calc. for $C_4H_4F_6O$: C, 26.4; H, 2.2%, M 182, b.p. 113° (iv) a product which is tentatively assigned as 2,3,3-trifluoro-2-trifluoromethylpropan-1-ol; $CF_3CF(CHF_2)CH_2OH$ (0.09 g., 0.5 mmole; 4% based on $C_3F_6$ consumed).

Methanol (7.7 g., 0.24 mole) and hexafluoropropene (12.0 g., 0.08 mole) were heated at 240° for 4 days in a 100 ml. Hastalloy-lined autoclave to give 2,2,3,4,4,4-hexafluorobutan-1-ol (1.8 g., 10.0 mmole; 31% based on $C_3F_6$ consumed) and the product tentatively assigned as 2,3,3-trifluoro-2-trifluoromethylpropan-1-ol (0.1 g., 0.5 mmole; 2% based on $C_3F_6$ consumed); no higher boiling products were detected.

EXAMPLE 4

Preparation of 4,4,5,6,6,6-Hexafluoro-3-methylhexane-3-ol

Butan-2-ol (17.8 g., 0.24 mole) and hexafluoropropene (12.0 g., 0.08 mole), heated at 260°C for 4 days in a 100 ml. Hastalloy-lined autoclave gave (i) hexafluoropropene (8.1 g., 54.2 mmole; 68% recovery) and a mixture of cis- and trans-but-2-ene (2.14 g., 38.2 mmole); (ii) butan-2-ol (113 g., 153 mmole; 64% recovery); (iii) 4,4,5,6,6,6-hexafluoro-3-methylhexan-3-ol: $CH_3CH_2CMe(CF_2CHFCF_3)OH$ (4.7 g., 21 mmole; 81% based on $C_3F_6$ consumed) (Found: C, 37.8; H, 4.6% $C_7H_{10}F_6O$ requires C, 37.5; H, 4.5%) b.p. 157°–158°.

EXAMPLE 5

Preparation of 1-Chloro-2,2,3,4,4,4-hexafluorobutane

Methyl chloride (1.73 g., 34.2 mmole) and hexafluoropropene (1.71 g., 11.4 mmole) were heated at 280° for 4 days in a Pyrex vessel to give: (i) a gaseous product shown to contain hexafluoropropene (1.11 g., 65% recovery) and methyl chloride (149 g., 29.8 mmole; 86% recovery); (ii) a liquid mixture which contained 1-chloro-2,2,3,4,4,4-hexafluorobutane $CH_2Cl.CF_2.CHF.CF_3$ (0.63 g., 3.2 mmole; 80% based on $C_3F_6$ consumed) (Found: C, 24,2; H, 1.5%; M, 198. $C_4H_3ClF_6$ requires C, 24.0; H, 1.5%; M, 200.5); b.p. (isoteniscope) 86.5°C.

EXAMPLE 6

Preparation of 1,1-Dichloro-2,2,3,4,4,4-hexafluorobutane

Methylene chloride (2.91 g., 34.2 mmole) and hexafluoropropene (1.71 g., 11.4 mmole) were heated at 380° for 4 days in a Pyrex ampoule to give: (i) hexafluoropropene (0.23 g., 1.5 mmole; 14% recovery); (ii) methylene chloride (1.90 g., 22.4 mmole; 66% recovery), b.p. 41°; (iii) a liquid mixture (2.30 g.), b.p. 91°–3°, containing 1,1-dichloro-2,2,3, 4,4,4-hexafluorobutane $CHCl_2.CF_2.CHF.CF_3$ (2.02 g., 8.6 mmole; 87% based on $C_3F_6$ consumed). Found: C, 20.4; H, 1.1, $C_4H_2Cl_2F_6$ requires C, 20.4; H, 0.9%, b.p. (isoteniscope) 90.5°C.

EXAMPLE 7

Preparation of 1,1,1-Trichloro-2,2,3,4,4,4-hexafluorobutane

Chloroform (4.1 g., 34.2 mmole) and hexafluoropropene (1.71 g., 11.4 mmole) were heated at 280°C for 4 days to give: (i) hexafluoropropene (1.49 g., 9.92 mmole: 87% recovery), (ii) chloroform (3.81 g., 31.9 mmole; 95% recovery), b.p. 61°–3°; (iii) 1,1,1-trichloro-2,2,3,4,4,4-hexafluorobutane $CCl_3.CF_2.CHF.CF_3$ (0.32 g., 1.2 mmole; 80% based on $C_3F_6$ consumed). Found: C, 18.0; H, 0.5; F, 41.8. $C_4HCl_3F_6$ requires C, 17.8; H, 0.4; F, 42.3%, b.p. 112°C.

EXAMPLE 8

Preparation of 1,2,2,3,4,4,4-Heptafluorobutane

Methyl fluoride (0,82 g., 24.1 mmole) and hexafluoropropene (1.81 g., 12.05 mmole) were heated at 280°C for 4 days in a Pyrex ampoule to give: (i) a gaseous product, which condensed at −196° in vacuo, containing methyl fluoride (0.7 g., 20.7 mmole; 86% recovery) and hexafluoropropene (1.25 g., 8.3 mmole; 69% recovery); (ii) a fraction which condensed at −95° in vacuo containing 1,2,2,3,4,4,4-heptafluorobutane $CH_2F.CF_2.CHF.CF_3$ (0.515 g., 2.8 mmole; 76% based on $C_3F_6$ consumed). Found: C, 26.4; H, 1.9% M, 183. $C_4H_3F_7$ requires C, 26.1; H, 1.9%; M, 184), b.p. (isoteniscope) 42.0°C.

EXAMPLE 9

Preparation of 1,1,2,2,3,4,4,4-octafluorobutane

Methylene fluoride (1.78 g., 34.2 mmole) and hexafluoropropene (1.71 g., 11.4 mmole) were heated at 280° for 4 days in a Pyrex ampoule to give: (i) hexafluorpropene (1.56 g., 10.4 mmole; 91% recovery) and methylene fluoride (1.71 g., 32.9 mmole; 96% recovery); (ii) 1,2- and 1,3-bis(trifluoromethyl)hexafluorocyclobutanes (0.021 g., 0.07 mmole; 14% based on $C_3F_6$ consumed); (iii) 1,1,2,2,3,4,4,4-octafluorobutane $CHF_2.CF_2.CHF.CF_3$ (0.17 g., 0.85 mmole; 85% based on $C_3F_6$ consumed) Found: C, 24.1; H, 1.3%; M, 202. $C_4H_2F_8$ requires C, 28.3; H, 1.0; M, 202), b.p. (isoteniscope) 35.6°.

EXAMPLE 10

Preparation of 1-Chloro-1,1,2,2,3,4,4,4-Octafluorobutane

Chlorodifluoromethane (51.9 g., 0.6 mole) and hexafluoropropene (30.0 g., 0.2 mole) were heated at 275° for 3 days in a 250 ml. Hastalloy-lined autoclave to give: (i) a gaseous fraction containing chlorodifluoromethane (38.1 g., 0.44 mmole; 73% recovery) and hexafluoropropene (4.5 g., 30 mmole; 15% recovery); (ii) 1-chloro-1,1,2,2,3,4,4,4-octafluorobutane $CF_2Cl.CF_2.CHF.CF_3$ (21.1 g., 89 mmole; 52% based on $C_3F_6$ consumed) (Found: C, 20.5; H, 0.7%; M, 283. $C_4HClF_8$ requires C, 20.3; H, 1·0.4T; M, 236.5), b.p. 44.5°.

EXAMPLE 11

Preparation of 4-Chloro-1,1,1,2,3,3-hexafluoropentane

Ethyl chloride (2.57 g., 39.9 mmole) and hexafluoropropene (1.99 g., 13.3 mmole) were heated at 280° for 3 days in a Pyrex ampoule to give: (i) a gaseous fraction containing hexafluoropropene (1.31 g., 8.7 mmole; 65% recovery) and ethyl chloride (2.2 g., 34 mmole; 85% recovery); (ii) a liquid mixture (0.60 g.) from which was isolated, by g.l.c., 4-chloro-1,1,1,2,3,3,-hexafluoropentane $CH_2.CHCl.CF_2CHF.CF_3$ (0.46 g., 2.2 mole; 48% based on $C_3F_6$ consumed) (Found: C, 28.7; H, 2.6; F, 53.0. $C_5H_5ClF_6$ requires C, 28.0; H, 2.3; F, 53.2%,), b.p. 92°–93°C.

EXAMPLE 12

Preparation of 1,1,1,2,3,3,4-Heptafluoropentane

Ethyl fluoride (1.86 g., 38.7 mmole) and hexafluoropropene (1.93 g., 12.9 mmole) were heated at 295° for 4 days in a Pyrex ampoule to give: (i) ethyl fluoride (1.51 g., 31.4 mmole; 81% recovery) and hexafluoropropene (1.13 g., 7.5 mmole; 58% recovery); (ii) a liquid mixture (1.13 g.,) from which was isolated 1,1,1,2,3,3,4-heptafluoropentane $CH_3.CHF.CF_2.CHF.CF_3$ (1.03 g., 5.2 mmole; 96% based on $C_3F_6$ consumed) (Found: C, 30.6; H, 2.5%, M, 198. $C_5H_5F_7$ requires C, 30.3; H, 2.5%; M, 198) b.p. 67°–69°C.

EXAMPLE 13

Preparation of 1,1,1,2,3,3,4,4-Octafluoropentane 1,1-Difluoroethane (2.56 g., 38.7 mmole) and hexafluoropropene (1.94 g., 12.9 mmole) were sealed in vacue into a 250 ml. Pyrex ampoule and heated at 290° for 4 days to give (i) hexafluoropropene (1.88 g., 12.5 mmole; 97% recovery), 1,1-difluoroethane (2.35 g., 35.6 mmole; 92% recovery), and (ii) mixture (0.13 g.) from which was isolated 1,1,1,2,3,3,4,4-octafluoro pentane $CH_3.CF_2.CF_2.CHF.CF_3$ (ca. 0.08 g., 0.37 mmole; 91% yield based on hexafluoropropene consumed) (Found: C, 28.1; H, 2.1. $C_5H_4F_8$ requires: C, 27.8; H, 1.9%), b.p. 60°C. When hexafluoropropene (30.0 g., 0.2 mole) and 1,1-difluoroethane (39.6 g., 0.6 mole) were heated at 290° for 4 days in a 250 ml. Hastaloy autoclave 1,1,1,2,3,3,4,4-octafluoropentane (1.8 g., 8.3 mmole; 65% yield based on hexafluoropropene consumed) was obtained.

EXAMPLE 14

Preparation of 1,1,1,2,3,3,5,5,5-Nona fluoropentane 1,1,1-trifluoroethane (19.8 g., 236 mmole) and hexafluoropropene (11,8 g., 79 mmole) were sealed in vacuo into a 100 ml. Hastalloy autoclave and heated at 310°C for 6 days to give: (i) hexafluoropropene (9.9 g., 66 mmole; 84% recovery), 1,1,1,-trifluoroethane (16.4 g., 196 mmole; 83% recovery) and (ii) a liquid mixture (4.8g.,) from which was isolated 1,1,1,2,3,3,5,5,5-nonafluoropentane $CF_3.CH_2.CF_2.CHF.CF_3$ (ca. 2.2 g., 9.2 mmole; 71% yield based on hexafluoropropene consumed) (Found: C, 25.7; H, 1.5. $C_5H_3F_9$ requires: C, 25.6; H, 1.3%), b.p. 59.9° (isoteniscope).

EXAMPLE 15

Dimethylsulphide (24 mmole) and hexafluoropropene (8 mmole), heated for 93 hours at 305° in a sealed tube from which air, moisture and other possible contaminants were rigidly excluded, gave $CF_3.CHF.CF_2.CH_2.S.CH_3$ (66% yield and conversion) b.p. 119°. A small amount of $CHF_2.CF(CF_3).CH_2.S.CH_3$ was also produced.

EXAMPLE 16

Insertion into Polymethylmethacrylate

Hexafluoropropene, heated with "Perspex" polymethylmethacrylate powder at 280°C for 7 days at 80 atmos., gave a dark colored oil which analysed as (methylmethacrylate unit)$_4(C_3F_6)$.

EXAMPLE 17

Insertion into a Polyester

Hexafluoropropene, under conditions similar to those given in the earlier examples, reacted with "Terylene" polyethylene terephthalate to give a brown material which contained approximately one $C_3F_6$ unit for 35 terylene units.

EXAMPLE 18

Insertion into a polycarbonate

The polycarbonate

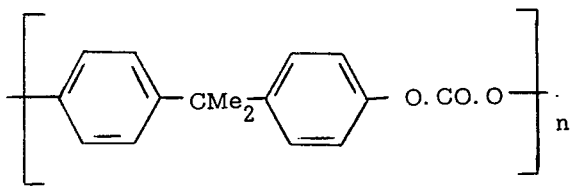

reacted with hexafluoropropene under conditions as above without significant change in color. The product analysed as $(C_{16}H_{14}O_3)_{34}(C_3F_6)$, had good thermal stability and a high softening point.

We claim:
1. A process for inserting hexafluoropropene into the structure of a substituted hydrocarbon compound free of acetylenic and terminal ethylenic unsaturation, and containing at least one aliphatic carbon-hydrogen bond and at least one functional moiety inert under the conditions of reaction selected from the class consisting of halogens, said insertion of hexafluoropropene being at said carbon-hydrogen bond, which comprises contacting said substituted hydrocarbon compound with hexafluoropropene monomer at a temperature in the range of about 160°C to about 350°C, and at a pressure of about 1 to about 250 atmospheres, in the absence of free oxygen-containing gases and free-radical catalyst.

2. A process according to claim 1 wherein the temperature is in the range of about 220°C to 300°C and the pressure is from 10 to 100 atmospheres.

3. A process according to claim 1 wherein the molar ratio of hexafluoropropene to the substituted hydrocarbon reactant is in the range of 2:1 to 4:1.

* * * * *